(12) United States Patent
Benesh et al.

(10) Patent No.: US 8,300,797 B1
(45) Date of Patent: Oct. 30, 2012

(54) GLOBAL VIEW OF PERFORMANCE MANAGEMENT IN A DIVERSE CALL CENTER ENVIRONMENT

(75) Inventors: Jared Benesh, Olathe, KS (US); Robert E. Norton, Jr., Lee's Summit, MO (US); Thomas S. Sullivan, Kansas City, MO (US); Raman Wadehra, Shawnee, KS (US); Lance Williams, Leawood, KS (US); Mitchell L. Windsor, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 174 days.

(21) Appl. No.: 12/915,708

(22) Filed: Oct. 29, 2010

(51) Int. Cl.
*H04M 3/00* (2006.01)
(52) U.S. Cl. .............................. 379/265.03; 379/265.06
(58) Field of Classification Search ............. 379/265.03, 379/265.06, 265.07, 266.06
See application file for complete search history.

(56) References Cited

U.S. PATENT DOCUMENTS

| | | | |
|---|---|---|---|
| 2004/0088699 A1* | 5/2004 | Suresh | 717/174 |
| 2005/0043986 A1* | 2/2005 | McConnell et al. | 705/11 |
| 2010/0076895 A1* | 3/2010 | Spencer et al. | 705/80 |
| 2010/0086120 A1* | 4/2010 | Brussat et al. | 379/265.12 |
| 2012/0046999 A1* | 2/2012 | Jayaraman et al. | 705/7.39 |

* cited by examiner

*Primary Examiner* — Creighton Smith (57) ABSTRACT

A computer system is provided comprising processor, memory, and application, that, when executed, receives input about a behavior associated with a metric. The system receives input about a first coaching program applied to the behavior and calculates a first change in the metric and receives input about a second coaching program applied to the behavior based on the first change in the metric and based on a first change in the behavior. The system calculates a second change in the metric associated with a second change in the behavior. The system determines a first element of the first coaching program that impacted the first change in the behavior. The system determines a second element of the second coaching program that impacted the second change in the behavior and combines the first element and the second element in a third coaching program for use in applying to instances of the behavior.

20 Claims, 6 Drawing Sheets

GLOBAL VIEW OF PERFORMANCE MANAGEMENT IN A DIVERSE CALL CENTER ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Call centers receive and transmit large volumes of requests by telephone. A call center may be operated by a company to administer incoming product support information inquiries from consumers. Outgoing calls for telemarketing, information gathering such as surveys, product services, and debt collection are also made. Call centers may be operated using call center agents with workstations that include a computer for each agent, a telephone handset or headset connected to a telecom switch, and one or more supervisor stations. A call center may be independently operated or networked with additional call centers. Multiple centers may be linked to a corporate voice and data network that may include mainframe computers, servers, databases, and a plurality of client devices. Many large organizations use call centers to interact with their customers. Examples include financial service providers, airlines, utility companies, and customer support for computer hardware and software. Some businesses may support internal functions through call centers. Examples of this include help desks to assist employees with network issues and administration of employee assistance programs.

SUMMARY

In an embodiment, a computer system is provided comprising a processor, a memory, and an application, that, when executed by the processor, receives input about a first observed behavior associated with a first performance metric. The computer system also receives input about a first coaching program applied to the first observed behavior. The computer system also calculates a first change in the first performance metric and receives input about a second coaching program applied to the first observed behavior based on the first change in the first performance metric and based on a first observed change in the first observed behavior. The computer system also calculates a second change in the first performance metric associated with a second observed change in the first observed behavior. The computer system also determines a first element of the first coaching program that impacted the first observed change in the first observed behavior. The computer system also determines a second element of the second coaching program that impacted the second observed change in the first observed behavior. The computer system also combines the first element and the second element in a third coaching program for use in applying to instances of the first observed behavior associated with the first performance metric.

In an embodiment, a processor-implemented method is provided. The method comprises a measurement server determining a first composite performance measure for a first agent in a call center environment wherein first composite performance measures are determined for each of a plurality of agents. The method also comprises the measurement server ranking the plurality of agents in order by first composite performance measure determined for each agent. The method also comprises the measurement server associating each of the agents with one of a first segment, a second segment, a third segment, and a fourth segment based on the ranking. The method also comprises the measurement server applying a first coaching program to agents associated with the first segment, applying a second coaching program to agents associated with the second segment, applying a third coaching program to agents associated with the third segment, and applying a fourth coaching program to agents associated with the fourth segment. After a predetermined time period subsequent to the application of the coaching programs, the method also comprises the measurement server determining a second composite performance measure for the first agent wherein second composite performance measures are additionally determined for the plurality of agents. The method also comprises the measurement server ranking the plurality of agents in order by second composite performance measure determined for each agent. The method also comprises the measurement server associating each of the agents with one of the first segment, with the second segment, with the third segment, and with the fourth segment based on the ranking. The method also comprises the measurement server analyzing changes in the associations of agents with the segments from the determination of the first composite performance measures to the determination of the second composite performance measures. The method also comprises the measurement server executing changes to the coaching programs based on the analysis of changes in associations of agents with the segments from the determination of the first composite performance measures to the determination of the second composite performance measures.

In an embodiment, a processor-implemented method is provided. The method comprises a measurement server receiving a first report of agent performance in a call center environment wherein a first plurality of agents described in the report achieve satisfactory levels for a first performance metric and a second performance metric and achieve unsatisfactory levels for a third performance metric. The method also comprises the measurement server observing a plurality of telephone calls handled by a second plurality of agents, wherein the second plurality of agents is a subset of the first plurality of agents. The method also comprises the measurement server determining that a first behavior is exhibited by the second plurality of agents during at least a predetermined percentage of the observed plurality of telephone calls. The method also comprises the measurement server determining that the first behavior is associated with the unsatisfactory levels for the third performance metric. The method also comprises the measurement server creating a first coaching program directed to reducing instances of the first behavior. The method also comprises the measurement server administering the first coaching program to a third plurality of agents, wherein the third plurality is a subset of the second plurality. The method also comprises the measurement server receiving a second report of agent performance, the second report describing performance of the third plurality of agents in achieving levels of the first performance metric, the second performance metric, and the third performance metric subsequent to the administration of the first coaching program, the second report additionally describing the performance of a fourth plurality of agents in achieving levels of the first performance metric, the second performance metric, and the third performance metric, wherein the fourth plurality of agents comprises the first plurality of agents less the third plurality of agents. The method also comprises the measurement server executing at least a first change to the first coaching program based on an analysis of the second report.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and methods that promote an organization employing a plurality of agents in a diverse call center environment to rank and to segment agents by various performance metrics, to identify prevalent observable behaviors for each segment, and to apply selected coaching programs to alter the behaviors. The organization may subsequently capture performance metrics, rank and segment agents again, and note changes from previous cycles through this process. This may promote analysis, conclusion, and action directed to the effectiveness of the coaching programs and the parties that administer them. The system promotes continuing analysis of a history of observed behaviors impacted by coaching decisions and leading to adjustments and improvements in coaching programs. The system promotes analysis of individual agent professional growth and analysis of coaching programs across groups of agents. The system also promotes analysis of the effectiveness of supervisors and trainers across groups of agents and across coaching programs. For an organization operating a plurality of call centers, the system promotes analysis of agent, supervisor, and trainer performance across the call centers.

A telecommunications services provider or other large organization may employ thousands of agents in a plurality of call centers in various countries. The organization may measure agent performance globally using call center performance metrics such as average handle time (AHT) and first call resolution (FCR) percentage. The present disclosure teaches that agent performance as measured by performance metrics is driven by agent behaviors that are observable and quantifiable across a plurality of observed agents. Over a series of observations of a population of agents across months, quarters, or other time periods, changes in agent behaviors may be observed. Observed behavioral changes may be measured in association with changes in metrics. Coaching programs may be selectively applied against behaviors exhibited by collections of ranked agents falling into various performance segments. Different coaching programs may be applied depending upon the segment in which agents are placed. With each successive cycle or iteration of agent measurement, ranking, and segmentation with accompanying observation of behaviors and application of coaching programs, the effectiveness of coaching programs in altering observed behaviors and improving agent performance may be determined. Repeated observations of agents may feed changes in the content and administration of coaching programs that in turn influence changes in behavior and improvement in performance, potentially leading to improved business results.

The system and method of the present disclosure may promote detection of patterns of observable behaviors providing clues or fingerprints for problems that are discovered to be repeatedly associated with specific call center and customer issues. Some specific combinations of observed behaviors, levels of some performance metrics, and perhaps non-metric factors such as agent tenure, education level, or call center may be found to be linked with specific recurring business problems for the organization. Such problems may comprise agents too readily providing discounts or credits, authorizing return of sold products, shipping out free products, or achieving poor metrics such as high average handle time (AHT) or relatively low first call resolution (FCR). The system and methods provided herein may identify or suggest not readily apparent combinations of behaviors and other factors that provide clues or fingerprints leading to solutions for such recurring business problems.

Figure 1:
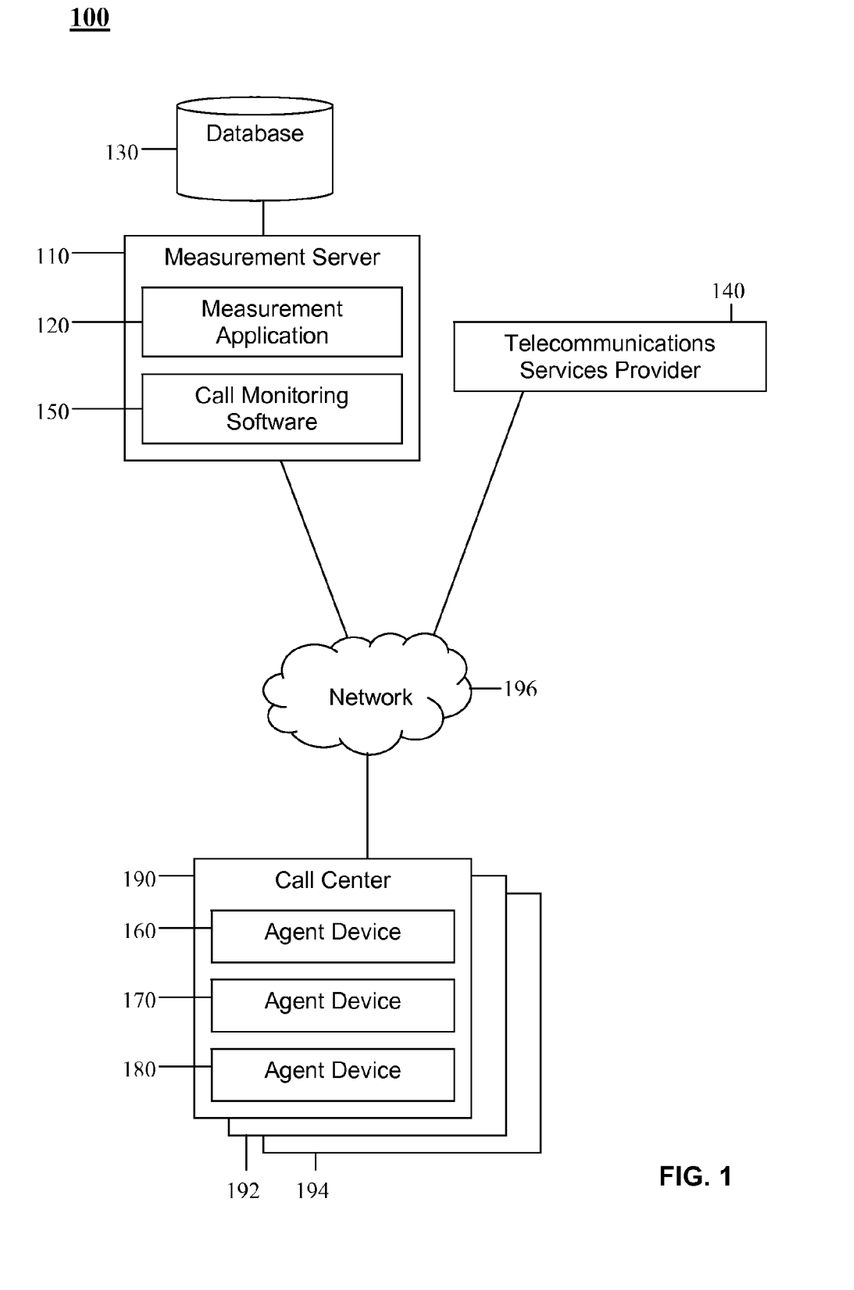
FIG. 1 is a block diagram of a system according to an embodiment of the disclosure.

Turning now to FIG. 1, a system 100 is provided. The system 100 comprises a measurement server 110, a measurement application 120, a database 130, a telecommunications services provider 140, call monitoring software 150, agent devices 160, 170, 180, call centers 190, 192, 194, and a network 196.

The measurement server 110 is a computer system. Computer systems are described in detail hereinafter. The measurement application 120 executes on the measurement server 110 and receives a plurality of information about various metrics associated with performance by agents working in call center environments. The measurement application 120 may perform a plurality of statistical analysis operations on the metrics. The measurement application 120 may incorporate into its operations other information associated with the agents and the business supported by the call centers 190, 192, 194 employing the agents. The statistical analysis may lead to identification by the measurement application 120 or other components of observable behaviors by agents that may impact the metrics. The measurement application 120 itself may identify directly observed behaviors or may identify trends or other changes in metrics that may suggest behaviors. The behaviors may be addressable by coaching programs that reduce instances of the behavior if the behavior is adversely impacting at least one metric. The coaching programs may be directed to encouraging other behaviors that are determined to favorably impact metrics. The measurement application 120 may promote analysis of individual agents, groups of agents, entire call centers 190, 192, 194, and all agents employed by an organization across a plurality of call centers 190, 192, 194. The measurement application 120 may promote evaluation of coaching programs across agents and across call centers 190, 192, 194. The measurement application 120 also may promote evaluation of supervisors, trainers, and subject matter experts that may design and administer the coaching programs to agents.

The telecommunications services provider 140 may employ a plurality of agents working in a plurality of call centers 190, 192, 194. In an embodiment, the telecommunications services provider 140 may operate the plurality of call centers 190, 192, 194 in a plurality of countries. When thousands of agents are handling millions of customer or other calls per year in a plurality of call centers 190, 192, 194, accomplishing even a small improvement in an agent performance metric across a significant plurality of agents may have a material impact on customer experience and profitability. Determining the performance metrics that are most relevant to customer satisfaction, to new and repeat sales, and to profitability may promote an observation, identification, and analysis of some behaviors exhibited by call center agents that impact the metrics. By understanding the metrics and the agent behaviors that may impact those metrics both favorably and unfavorably, the telecommunications services provider 140 may develop coaching programs that desirably influence the behaviors and by connection, the metrics. The present disclosure teaches the development of coaching programs that may be directed to identified behaviors and the subsequent measurement of the at least one metric impacted by the behaviors. Changes in the measured metric across a plurality of agents that received a coaching program may lead to conclusions about the effectiveness of the content of the coaching program, the manner of administration of the coaching program, and the person or persons administering the coaching program, if applicable.

Performance management in a call center environment involves choosing and capturing performance metrics, observing behavior that may affect metrics, coaching behaviors to improve performance, and driving accountability for performance. The present disclosure teaches that while metrics may provide guidelines or clues that lead to broader analysis about agent performance, management policies, and business trends of the telecommunications services provider 140, it is behaviors that drive metrics, and some behaviors may be identified, observed, coached, and improved upon. Metrics by themselves may not provide value until associated with correctly targeted management action. The present disclosure teaches that management action in a call center environment, including coaching programs, may be directed to observable behaviors exhibited by agents that handle calls with customers or others served by the telecommunications services provider 140. While metrics may comprise measuring tools, the coaching and influencing of behaviors by agents may drive more favorable performance that may be evidenced by improved metrics and ultimately, improved market share and profitability.

In a call center 190, a plurality of metrics may be captured and analyzed. An organization's call center 190 or call centers 190, 192, 194 may handle incoming telephone calls from customers, distributors of the organization's products, and the organization's employees in the field. The telephone calls may request technical support, installation support, product information, or assistance with presale or post-sale questions or problems. A call center 190 that employs tens, hundreds, or thousands of agents may use a private branch exchange (PBX) to handle its incoming calls and may use an interactive voice response system (IVR) to initially route the incoming calls. Calls may be routed to queues that are staffed by agents that may be trained in technical, sales, and/or service areas associated with the queues. Metrics, or measurements of activity, may be employed to measure various aspects of the agents' performance in handling the calls. In an embodiment, agents in a call center environment may place outgoing calls and this activity may be monitored and measured.

The call center 190 may use an average handle time (AHT) metric that measures the average total amount of time required by an agent to handle a customer call. This metric may comprise both the time spent on a live call with a customer as well as after call work (ACW), the time the agent may spend after the live call ends may comprise documenting the call in a problem record and taking other actions, such as arranging a service visit to the customer or arranging for a part to be sent to the customer. The call center 190 may measure customer satisfaction (CSAT) metrics measured in surveys taken immediately after the end of a call before the caller disconnects or subsequently in an outgoing call to the customer, in an electronic mail inquiry to the customer, or in another manner. A survey may ask the customer a series of questions that elicit quantifiable responses. The responses may be tabulated and a survey score determined. The call center 190 may gather a plurality of surveys associated with an agent's call activity and perform statistical analysis on the plurality of surveys to calculate composite customer satisfaction (CSAT) metrics for the agent.

The call center 190 may capture a first call resolution (FCR) metric based on a ratio of the number of times that the agent is able to resolve a caller's issue on the first call to the total number of calls handled by the agent. Handling second and subsequent customer calls on a single issue may be expensive for the telecommunications services provider 140 and damaging to customer satisfaction. A productive agent may resolve a customer's issue on the first call and avert customer callbacks on the same issue. A well performing agent may be associated with a high first call resolution (FCR) metric. The first call resolution (FCR) metric may be measured and expressed as a percentage of customer issues resolved during a first call relative to the total number of calls for newly reported problems handled in a predetermined time period. The organization may also measure agents on average revenue generated per call. While agents may have a primary responsibility of resolving issues reported by incoming callers, agents may have the opportunity to generate new revenue for the organization by, for example, selling additional products including goods, service contracts, or warranty coverage. Revenue per call, expressed in dollars or other measure, may be a metric used to rank agents and evaluate agent performance.

In an embodiment, the telecommunications services provider 140 or other organization may operate a plurality of call centers 190, 192, 194 in several or many countries. The call centers 190, 192, 194 may use private branch exchange (PBX) and other telephone call switching hardware acquired from a plurality of vendors. The call centers 190, 192, 194 also may use automatic call distribution (ACD) software and hardware provided by a plurality of vendors. The telecommunications services provider 140 may seek to measure the performance of agents across a plurality of call centers 190, 192, 194 and may seek to measure agent performance using criteria that is consistent across the call centers 190, 192, 194. Because of technical and design differences between the private branch exchange (PBX) products, automatic call distribution (ACD) products, and other tools provided by a plurality of vendors, adjustments may be made by the telecommunications services provider 140 to data generated by these components to normalize the results. The normalization may support consistent views of metrics generated by agents in various call centers 190, 192, 194 that may be in different countries. The normalization also may be executed to adjust for some variations between metrics associated with different call centers 190, 192, 194 because the call centers 190, 192, 194 handle different business processes, for example. The normalization may permit a side-by-side comparison of these call centers 190, 192, 194 and compensate or adjust for the differences between the types of business the call centers 190, 192, 194 handle. For example, a first call center 190 may handle a first contract to process incoming calls associated with a large retailer and a second call center 192 may process incoming calls under a second contract with a financial services provider. Normalization may promote analysis of metrics achieved by agents in the two call centers 190, 192 by compensating for processing differences associated with the first contract and the second contract. The telecommunications services provider 140 may apply business rules to adjust some of the data to meet the needs or requirements of management. In an embodiment, the refined metrics generated from the various raw data originated by the plurality of call centers 190, 192, 194 and normalized because of local processing differences may then be sent to a dashboard application that trainers, supervisors, subject matter experts, and executives may use to analyze the data across call centers 190, 192, 194.

For each type of agent, a set of performance metrics may be chosen and captured at regular intervals. Weights may be applied to each metric captured for an agent and a composite or blended performance measure may be calculated. The weights may vary depending on the type of program the agent supports, the formal job title held by the agent, and the job grade associated with the agent. The weights may be adjusted for the call center 190, 192, 194 in which the agent works, although the normalization process described above may be followed to promote "apples to apples" comparisons between agents and groups of agents across call centers 190, 192, 194. The weights also may be adjusted for tenure of the agent in the position or with the organization or to compensate for additional responsibilities the agent may be tasked with, for example mentoring newly hired agents. Weights applied to metrics may change from one period to the next depending on priorities set by call center 190, 192, 194 and executive management of the telecommunications services provider 140. For example, management may decide that average handle time (AHT) should receive a greater weight than previously and also decide that customer satisfaction (CSAT) should receive a lower weight than in previous periods.

In call center environments, it may be a practice for supervisors, customer service specialists, and others to monitor telephone calls received or placed by agents as well as monitor other activities of agents associated with the calls. Monitoring activities may comprise listening to an agent handling a call with or without the agent's knowledge. In an embodiment, software may be installed in the agent telephone and agent device 160 and/or in the private branch exchange (PBX) used by the call center 190, 192, 194 with which the agent is associated that permits monitoring of the agent's calls. The call monitoring may comprise listening to voice activity during the call as well as monitoring actions by the agents such as placing the call on hold and speaking to other parties while the caller is on hold. Other software may permit monitoring of the keyboard, display, and pointing device activity of the agent on the agent device 160 such that the supervisor or other person observing the call may view all of the agent's actions on the agent device 160 without the agent's knowledge. In addition, call centers 190, 192, 194 may use closed-circuit or other video and audio monitoring equipment to monitor the physical movements and actions of agents in their work areas with or without the agents' knowledge. The apparatus described may permit full observation of calls handled by agents including actions taken by agents during and after calls have concluded. Observations of calls may take place on a live basis. Observations may alternatively be conducted after a call has been concluded. The observing person or persons may listen to the recorded call and view a taped record of entries into the actions of the agent device 160 as well as physical movements of the agent.

While observing a call on a live or taped basis, a supervisor may make entries in an electronic worksheet or other application listing favorable, unfavorable, and other behaviors exhibited by an agent during a call. Favorable behaviors may comprise addressing the caller by name, repeating the problem described by the caller and requesting validation, and thanking the customer at the close of the call. Unfavorable behaviors may comprise excessively placing the customer on hold to perform typing, typing slowly, and asking the caller the same question more than once. The observer may note that the agent is unable to talk and type at the same time and waited until the end of the call to enter notes into a transaction or call record, extending average handle time (AHT). The observer may compile a plurality of worksheets or other records noting instances of both adverse and favorable behaviors during calls.

Call monitoring software 150 may detect behaviors and agent actions during calls that supplement notes taken by observers about behaviors. While the call monitoring software 150 is depicted in FIG. 1 as executing on the measurement server 110, in an embodiment, the call monitoring software 150 may execute on a private branch exchange (PBX) used by the call center 190 or on another device. The call monitoring software 150 for example, may note the average number of times an agent places a caller on hold over a plurality of calls. The call monitoring software 150 may work in conjunction with software monitoring the agent's keyboard, display, and pointing device activity to determine that the agent frequently places the caller on hold to type into a problem record. The agent may alternatively not place the caller on hold while typing and/or manually creating notes but may discontinue conversation with the caller with the line open, potentially creating uncertainty or awkwardness for the caller. The call monitoring software 150, that may be provided in commercially available packages, may work with observation software used by the observer while monitoring a call on a live or taped basis. The observer may hear or see behaviors or actions by the agent during an observed call and make note of these items in the electronic worksheet used during observations. These observed items may be combined with electronic observations made by call monitoring software 150 that records telephone activity and actions taken with the agent device 160.

The measurement application 120 compiles the plurality of entries made by the observer into the electronic worksheet about agent behaviors along with entries generated by the call monitoring software 150 recording telephone and agent device activity during observed calls. The measurement application 120 may perform analysis of the compiled information generated by the observer and the information generated by the call monitoring software 150. The measurement application 120 also may access environmental information to supplement the observer notes and monitoring software notes. The environmental information may comprise relevant information about the larger setting or situation in which the agent was working during observed calls. The environmental information may describe factors that are beyond the agent's control but may impact the agent's performance and may be relevant to a supervisor's analysis of the agent. For example, when the call center 190 is experiencing unusually heavy call volume, agents may be compelled by shift supervisors to terminate calls more rapidly than usual to reduce hold times and queue backup. The call center 190 may be inundated with calls if an organization releases a product that is highly popular and may contain new features, for example, and results in an excessive quantity of calls, or calls that are more time-consuming than previously experienced by the call center 190. Agent performance may be adversely affected by heating and air conditioning failures or disruptive noise related to office construction or other unusual activity in the call center 190. Agent performance may also be affected by a cultural event of national, regional, or local interest, the approach of a holiday, or the threat or actual occurrence of a terrorist attack, a mass transportation strike, or sickness or epidemic. Managers or executives may issue directives that cause the measurement application 120 to adjust or exclude observation data recorded during these times of exceptional call activity or other agent stress.

When metrics are generated and periodically reported for an agent, the measurement application 120 may perform a plurality of statistical analysis on the metrics combined with the observation data gathered from both human observers and call monitoring software 150 as well as any environmental information entered by supervisors and managers that may impact metrics. The measurement application 120 may discover correlations between at least one metric and one or more behaviors. Such correlations may not be detectable from either formulaic or anecdotal analysis by a supervisor or customer service specialist, for example. The present disclosure teaches the linking of behaviors with metrics and the subsequent application of coaching programs and techniques to modify the behaviors. While some agent behaviors, whether favorable or adverse, may be readily linkable to performance metric activity through astute supervision and observation, the measurement application 120 may, through its statistical analysis, reveal additional, more subtle behaviors that may also bear upon metrics and the customer experiences that metrics measure.

Captured metrics may be combined and analyzed in a plurality of manners to determine overall composite performance evaluations for agents if this is deemed valuable by the management of the telecommunications services provider 140 or other organization. The metrics may be provided weights associated with importance decided by management and the weights may be applied to the metrics to calculate overall scores for agents. As noted, the weights may vary based on agent tenure, agent job title or grade, or on other factors.

The measurement application 120 may have access to the database 130 that contains listings and indices of a plurality of coaching programs. The database 130 may be associated with the measurement server 110. For a given metric, group of metrics, or composite evaluation, behaviors may be indicated in addition to those explicitly observed. Those observed or imputed behaviors may suggest the application of at least one coaching program to the agent or agents associated with the behaviors. Coaching programs may comprise online or hard-copy training modules that agents may administer to themselves or training modules that supervisors, trainers, or subject matter experts may administer to an agent or group of agents. Some training modules may be brief, for example refresher courses that may take a single agent away from handling calls for fifteen minutes during a slow period. Other training modules may, by contrast, be comprehensive in nature and may, for example, cause one of an organization's call centers 190, 192, 194 to be taken off line for an entire day while the agents there receive training for new call handling procedures. Coaching programs may be structured and evaluated not just by the content of the programs but also by who administers the programs and how they are administered. The present disclosure teaches the use of coaching programs to evaluate agent performance and behaviors after the programs have been administered. These evaluations may be compared to evaluations made before the coaching programs are administered. The present disclosure also teaches the judging of supervisor and trainer effectiveness in the administration of coaching programs. A coaching program may be long established and well known to effectively address an agent problem or behavior, but if not administered properly, it may not be successful. Coaching programs provide the organization the opportunity to evaluate the professional development of not just the agents that receive the coaching, but also the supervisors, trainers, and others that may design and administer the coaching.

Coaching and training may not be applied to all agents in the same manner. Depending on the quality of an agent's performance and the tenure of the agent, plus practical considerations including the amount of time the agent may be taken away from active telephone duty and the cost of training, coaching programs may vary. In an embodiment, two agents working in the same call center 190 may achieve the same metrics or composite performance evaluation in handling the same type of telephone calls and may even exhibit the same or similar behaviors in reaching these outcomes. In the embodiment, however, the two agents may receive different coaching programs because the agents have different employment histories, different educations, and different past performance records. The first agent may be considered a top performer and/or a candidate for promotion and the second agent may be a marginal or poor performer and may shortly not be employed at the call center 190. So despite the fact that the two agents may have achieved the same result under the same conditions in the present measurement period, for example the current quarter, and may exhibit the same behaviors in doing so, the two agents may receive different coaching programs because their general circumstances differ significantly. The present disclosure teaches matching coaching programs not just with behaviors but to additionally consider as criteria the history, education, and present circumstances of the agent that may suggest the value of the agent to the organization and hence the appropriate investment the organization should make in the agent's training.

A large organization such as the telecommunications services provider 140 may employ many thousands of agents across a plurality of call centers 190, 192, 194 and may wish to rank the agents and segment them in general groups by performance classification. Although the organization may not apply all of the same weights to all of the same metrics for the agents given the size and diversity of the organization's business, it may still apply criteria to place all of its agents in a single ranking. The organization may then place each of the ranked agents into one of several segments ranging from a first segment containing the highest ranked agents to a last segment containing the lowest ranked agents. In an example, the organization may create four segments and place each of its ranked agents in one of the four segments. The first segment may comprise the highest ranking portion of agents by composite performance measures, the second segment may comprise the second highest ranking portion, the third segment may comprise the third highest ranking portion, and the fourth segment may comprise the fourth highest or lowest ranking portion of agents by composite performance measures. This segmentation of agents may be effective only for the current cycle of metric measurement and ranking.

In an embodiment, the organization may place its agents equally in each segment, with 25% of its agents in each segment, assuming four segments are used. In an example, the telecommunications services provider 140, a large financial services company, or a software vendor may employ 10,000 agents globally and may place 2,500 agents in each of four segments. In another embodiment, the organization may allocate agents by about 15%, about 35%, about 35%, and about 15% across the four segments so that only the first 1,500 agents are in the highest segment, the lowest rated 1,500 agents are in the lowest segment, and 3,500 agents are placed in each of the second and third segments. Agents may be distributed to four segments according to a normal or standard distribution. For example, agents associated with above average metrics but having metrics within a first standard deviation of the average metrics may be placed in a second highest segment, agents associated with below average metrics but having metrics within a first standard deviation of the average metrics may be placed in a third highest segment, agents associated with above average metrics greater than a first standard deviation above the average metrics may be placed in a first highest segment, and agents associated with below average metrics more than a first standard deviation below the average metrics may be placed in the fourth highest segment. Alternatively, in another embodiment, the dividing point between the second highest and the first highest segments and between the third highest and the fourth highest segments may be offset from the average metrics by more or less than a single standard deviation. Alternatively, the dividing point between the second highest and the third highest segments may be offset either above or below the average metrics.

In another embodiment, however, the agents may be distributed into the four segments according to a different distribution. The organization may alternatively not allocate agents evenly or normally across segments, and may, for example reserve the highest segment for the top 10% of agents and place the bottom 50% of agents in the lowest segment. The placement of agents in the bottom segment is not to suggest that disciplinary action is targeted to the agents and that agents in this segment are to be placed in some type of probationary status. Rather, their placement in this segment may be for purposes of targeting coaching programs providing remedial coaching. As with the application of weights, two or more agents may be placed in the same segment for different reasons. A first agent may have been employed with the organization only sixty days and may be therefore by rule be placed in the bottom segment along with second agent that is an established employee but has exhibited degradation of performance over an extended period and may be at risk of termination. In an embodiment, the telecommunications services provider 140 or other organization may use established statistical techniques to place ranked agents in segments. Such statistical techniques may comprise the use of well known statistical distributions including normal distribution, chi distribution, or Gamma distribution, for example.

In addition to placing ranked agents into segments in accordance with where the agents fall in the single large ranking of all agents, the telecommunications services provider 140 or other organization may apply rules to agents unrelated to their rankings to further qualify the agents for correct placement in a segment. For example, the organization may require that an agent achieve in the top tenth percentile of a particular metric to be placed in the top segment, regardless of level achieved for other metrics. In another example, the organization may not place an agent in the highest segment if the agent has received even a single dissatisfied customer survey during a measurement period, no matter how the agent has otherwise achieved.

The telecommunications services provider 140 may perform the segmenting of agents for purposes of applying different types and levels of coaching programs to agents. Segmentation may promote the organization to choose and apply the correct type of coaching to the group of agents that needs it. The measurement application 120 may apply a plurality of statistical and other analysis to data about observed behaviors exhibited by agents within a segment. The measurement application 120 may determine behaviors predominantly exhibited by agents in each segment and may direct the specific coaching programs to be applied to agents in each segment. In an embodiment, the measurement application 120 may direct that different agents within a segment receive different coaching programs, and this directive may be based on the differing tenures of agents, the differing call centers 190, 192, 194 they work in, or the different products they support.

The measurement application 120 may examine a specific segment, the behaviors found to be exhibited by the agents within the segment, and the metrics associated with the agents in the segment grouped by behaviors. The measurement application 120 may then recommend that coaching programs are applied according to this further segmentation of agents within the segment. Coaching programs are applied to influence behaviors and improve performance. Within a segment, a first group of agents may receive a first coaching program because those agents may be viewed as likely candidates to improve and move up to the next segment because of some characteristics of behaviors they exhibit. A second group of agents within the same segment may be administered a second coaching program because those agents are viewed as at risk of falling to a lower segment after the next round of metrics are obtained. Even within a segment, the measurement application 120 may observe patterns of observed behaviors that present opportunities for growth or risks for further degradation of performance that may result in a portion of agents within the segment to receive a customized coaching program.

The measurement application 120 accesses the database 130 where records are stored about the effectiveness of coaching programs for combinations of observed behaviors associated with metrics. The measurement application 120 may access the database 130 to select a coaching program for a given situation. In an embodiment, the measurement application 120 may access algorithms and decision processes that match coaching programs with combinations of behaviors and metrics. The algorithms and decision processes may be regularly updated with results of the effectiveness of coaching programs applied to behaviors and metrics. The present disclosure teaches that the system progressively "learns" about how better to select and apply coaching programs to behaviors with each cycle or iteration of observation, evaluation, and application of coaching.

The present disclosure teaches that metrics and agent ranking may be determined on a regular basis, for example once per month or per quarter, and that segmenting of ranked agents may also be done on that basis. The measurement application 120 may examine where agents fall within segments from one month to the next or from one quarter to the next and may evaluate coaching programs applied after rounds of segmentation. This process may take place a plurality of times with various coaching programs applied after each round of segmentation depending on the progress that agents of interest may demonstrate. The iterative process of determining agent metrics, calculating overall performance, segmenting, determining behaviors, and finally applying coaching programs may be employed on a regular basis. The regular iterative process may promote not just evaluation of the agents and the progress they make but also evaluation of the coaching programs themselves and evaluation of the supervisors, trainers, and subject matter experts that may administer the training.

Over an extended period involving a plurality of agents, iterations of segmentation, applications of coaching programs, and deployments of trainers, the measurement application 120 may identify patterns of behaviors among groups of agents that when combined with other factors, may point to specific problems with a call center 190, with a hiring process, or with a training program, for example. The other factors may comprise the aforementioned environmental factors regarding the setting in which some metrics may be captured. Environmental factors may be outside of agents' control, such as extraordinarily heavy call load due a sister call center 192 being closed due to a weather emergency, for example. The measurement application 120 may detect combinations of metrics, behaviors, and perhaps environmental factors that may be associated with specific problems. The combinations of several factors may be fingerprints to problems or conditions that may warrant further investigation by management. The measurement application 120 may perform various analyses to determine the statistical significance of these relationships. These relationships may be subtle and non-obvious, even to experienced call center managers and customer service professionals. In an embodiment, the measurement application 120 may perform these statistical analyses as a matter of standard policy during off hours to reduce server load.

In an embodiment, when coaching programs may be new or not heavily tested and the effectiveness is therefore not known, control groups may be used. A group of agents with the same or similar metrics and observed behaviors may be divided into two subgroups. A first subgroup may be administered a new or untested coaching program and a second subgroup may be the control group and not be administered the coaching program. Since the two subgroups are substantially similar and other factors may be held as constant as possible, the effects of the coaching program may be determined. In an embodiment, the measurement application 120 may, after analyzing the effectiveness of a first coaching program and a second coaching program in addressing some observed agent behaviors, may combine selected elements of each coaching program to create a third coaching program.

The present disclosure teaches a cyclical or iterative process in which agent behaviors are observed and measured, the agents receive coaching directed to improve the agent behaviors, and the agent behaviors are observed and measured again to determine the response of agent behaviors to the coaching. It may be determined that some agent behaviors are tractable and respond favorably to coaching while other agent behaviors may be intractable and not respond to coaching. In an embodiment, in subsequent observation and coaching cycles, increased emphasis may be placed on observing and measuring those behaviors that have been found to respond favorably to coaching and to not observe and measure and coach those behaviors that have been found to be intractable to coaching. Alternatively, in an embodiment, in subsequent observation coaching cycles, both tractable and intractable behaviors may be observed and measured, but the agents exhibiting poor tractable behaviors may receive coaching to improve their tractable behaviors while those agents exhibiting poor intractable behaviors may be identified for elimination from the call center 190, 192, 194, for example during the next reduction in force initiative, for example by freezing and/or reducing compensation.

Agent devices 160, 170, 180 may be desktop, laptop, or other computer systems used in workstation or other settings by agents while handling calls. Agent devices 160, 170, 180 are described in detail hereinafter. Agent devices 160, 170, 180 may also comprise telephones and headsets.

In an embodiment, agents may not physically work in call center venues and may instead work in other locations, for example in home offices. Such agents' call activity may still be observed and measured in the same manner as agents physically located in call centers 190, 192, 194. In an embodiment, agents working in the call center 190 may not work for the telecommunications services provider 140 or other organization whose customers are serviced by the call center 190. Agents may be employed by employment contractors or other entities that provide agents under contract to the telecommunications services provider 140 or other organization.

The network 196 promotes communication between the components of the system 100. The network 196 may be any communication network including a public data network (PDN), a public switched telephone network (PSTN), a private network, and/or a combination thereof.

Although the measurement server 110 and the database 130 are described herein as operated or otherwise in the control of the telecommunications services provider 140, the measurement server 110 and the database 130 are depicted in FIG. 1 as outside the telecommunications services provider 140. In an embodiment, the measurement server 110 and the database 130 may be operated by parties other than the telecommunications services provider 140 with services provided under contract by such parties to the telecommunications services provider 140.

Figure 2A:
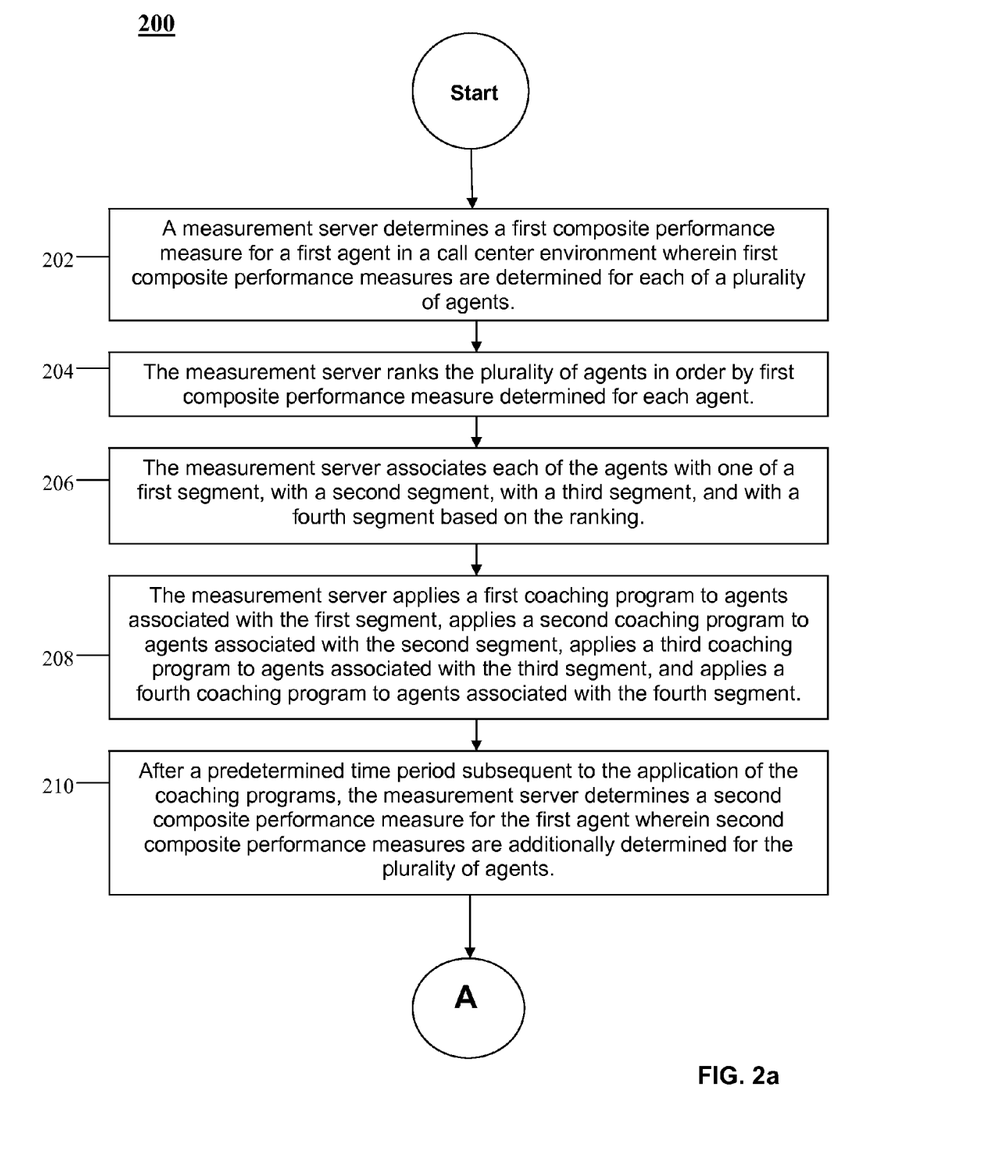
FIG. 2a is a flow chart illustrating a method according to an embodiment of the disclosure.
Figure 2B:
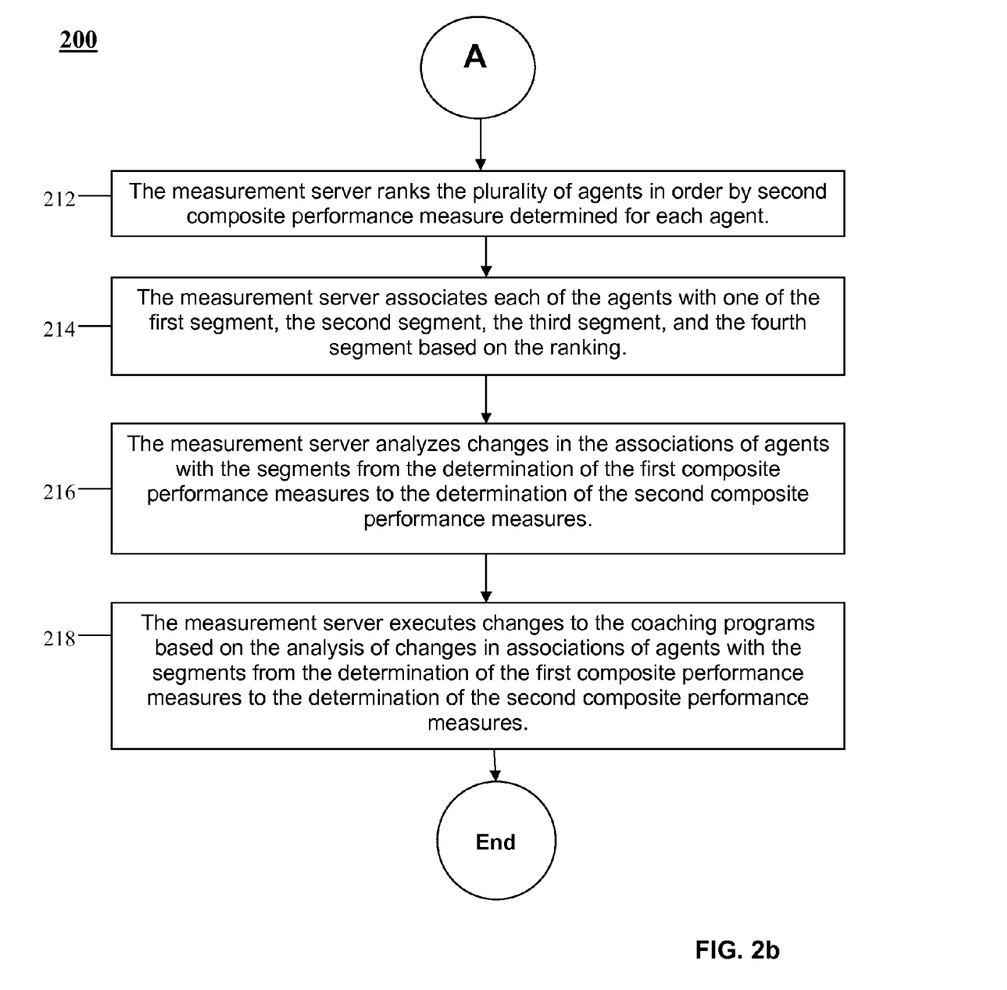
FIG. 2b is a flow chart illustrating a method according to an embodiment of the disclosure.

Turning now to FIG. 2a and FIG. 2b, a method 200 is provided. Beginning at block 202, a measurement server determines a first composite performance measure for a first agent in a call center environment wherein first composite performance measures are determined for each of a plurality of agents. At block 204, the measurement server ranks the plurality of agents in order by first composite performance measure determined for each agent.

At block 206, the measurement server associates each of the agents with one of a first segment, with a second segment, with a third segment, and with a fourth segment based on the ranking. At block 208, the measurement server applies a first coaching program to agents associated with the first segment, applies a second coaching program to agents associated with the second segment, applies a third coaching program to agents associated with the third segment, and applies a fourth coaching program to agents associated with the fourth segment.

After a predetermined time period subsequent to the application of the coaching programs, at block 210 the measurement server determines a second composite performance measure for the first agent wherein second composite performance measures are additionally determined for the plurality of agents. At block 212, the measurement server ranks the plurality of agents in order by second composite performance measure determined for each agent.

At block 214, the measurement server associates each of the agents with one of the first segment, the second segment, the third segment, and the fourth segment based on the ranking. At block 216, the measurement server analyzes changes in the associations of agents with the segments from the determination of the first composite performance measures to the determination of the second composite performance measures. At block 218, the measurement server executes changes to the coaching programs based on the analysis of changes in associations of agents with the segments from the determination of the first composite performance measures to the determination of the second composite performance measures. Such changes executed by the management server may comprise applying a coaching program determined to be successful to a larger number of agents, changing a component of a coaching program, and recommending that a different type of personnel administer the program than previously.

Figure 3A:
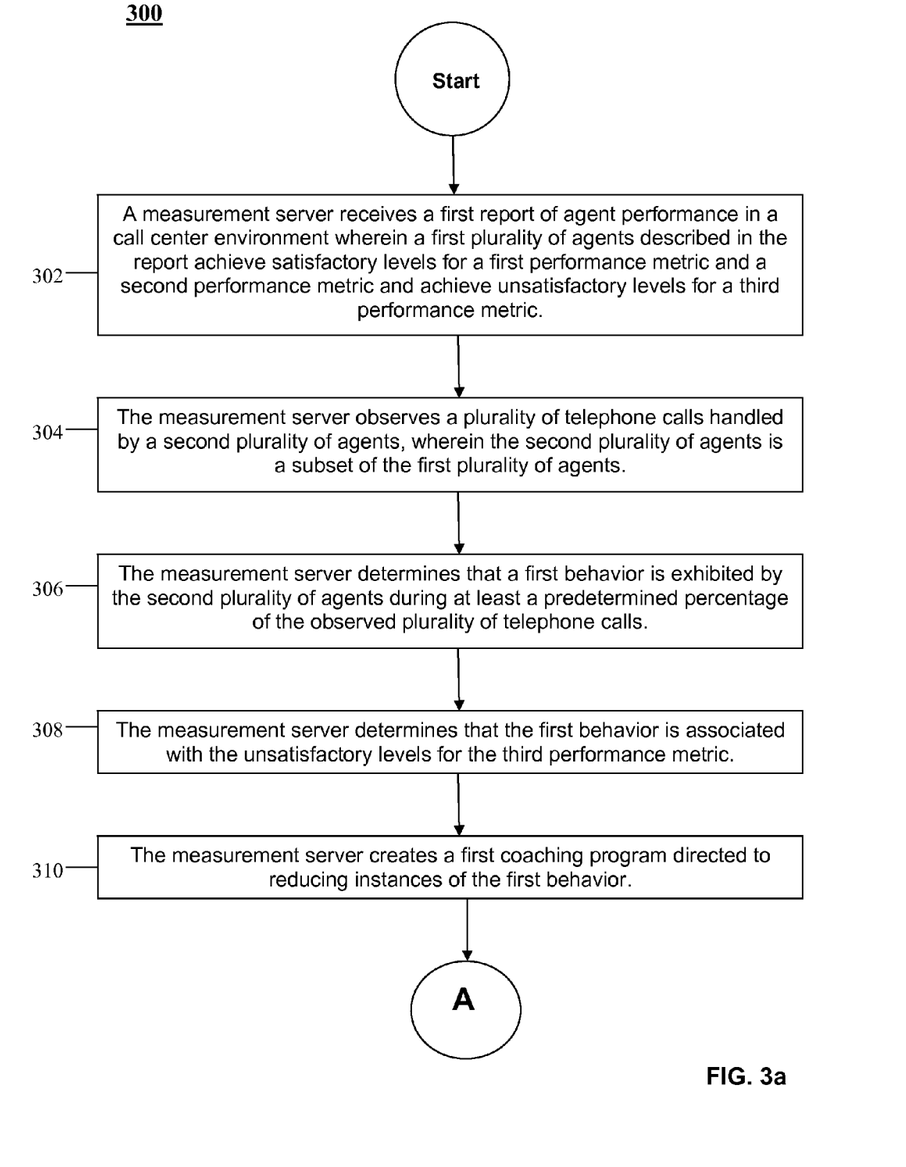
FIG. 3a is a flow chart illustrating a method according to an embodiment of the disclosure.
Figure 3B:
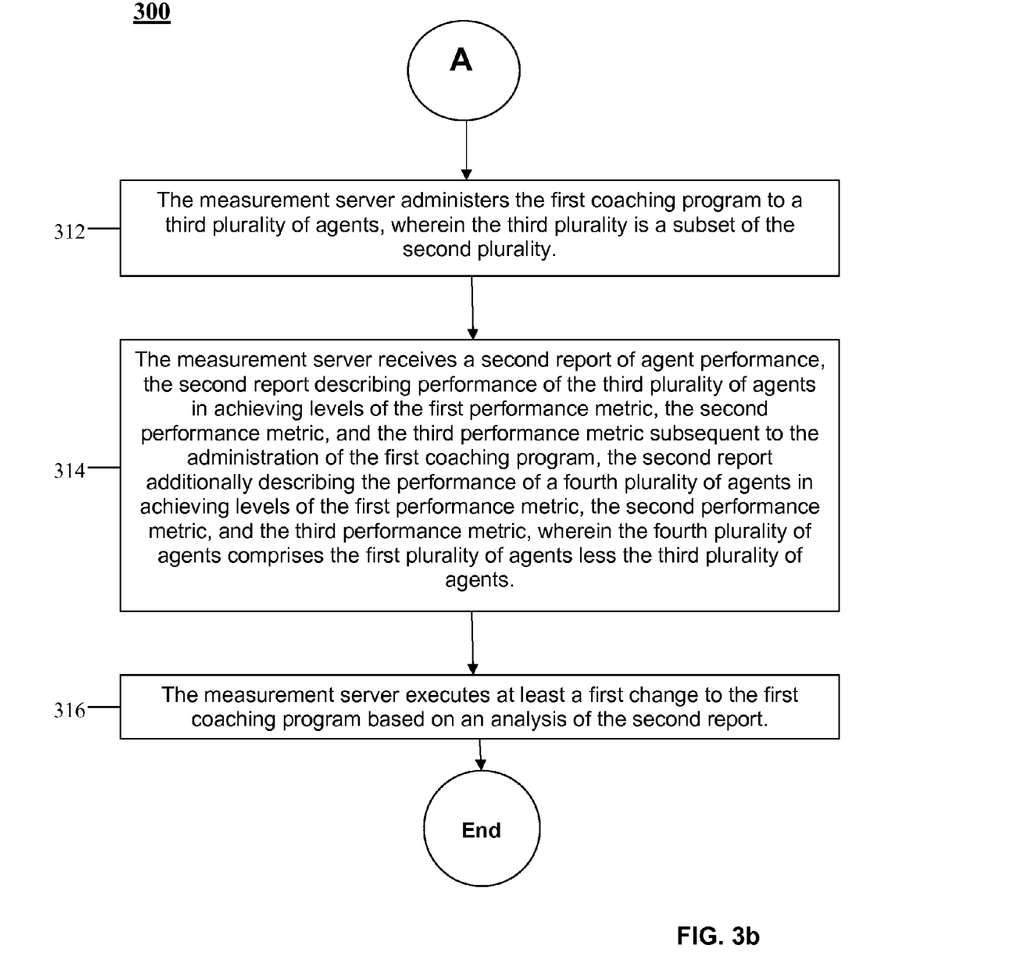
FIG. 3b is a flow chart illustrating a method according to an embodiment of the disclosure.

Turning now to FIG. 3a and FIG. 3b, a method 300 is provided. Beginning at block 302, a measurement server receives a first report of agent performance in a call center environment wherein a first plurality of agents described in the report achieve satisfactory levels for a first performance metric and a second performance metric and achieve unsatisfactory levels for a third performance metric. At block 304, the measurement server observes a plurality of telephone calls handled by a second plurality of agents, wherein the second plurality of agents is a subset of the first plurality of agents.

At block 306, the measurement server determines that a first behavior is exhibited by the second plurality of agents during at least a predetermined percentage of the observed plurality of telephone calls. At block 308, the measurement server determines that the first behavior is associated with the unsatisfactory levels for the third performance metric.

At block 310, the measurement server creates a first coaching program directed to reducing instances of the first behavior. At block 312, the measurement server administers the first coaching program to a third plurality of agents, wherein the third plurality is a subset of the second plurality.

At block 314, the measurement server receives a second report of agent performance, the second report describing performance of the third plurality of agents in achieving levels of the first performance metric, the second performance metric, and the third performance metric subsequent to the administration of the first coaching program, the second report additionally describing the performance of a fourth plurality of agents in achieving levels of the first performance metric, the second performance metric, and the third performance metric, wherein the fourth plurality of agents comprises the first plurality of agents less the third plurality of agents. At block 316, the measurement server executes at least a first change to the first coaching program based on an analysis of the second report. The first change to the first coaching program may comprise defining a larger group of agents to whom the program is administered, applying the program earlier in an agent's tenure, or adding a knowledge measure to be administered at the end of the program, for example.

Figure 4:
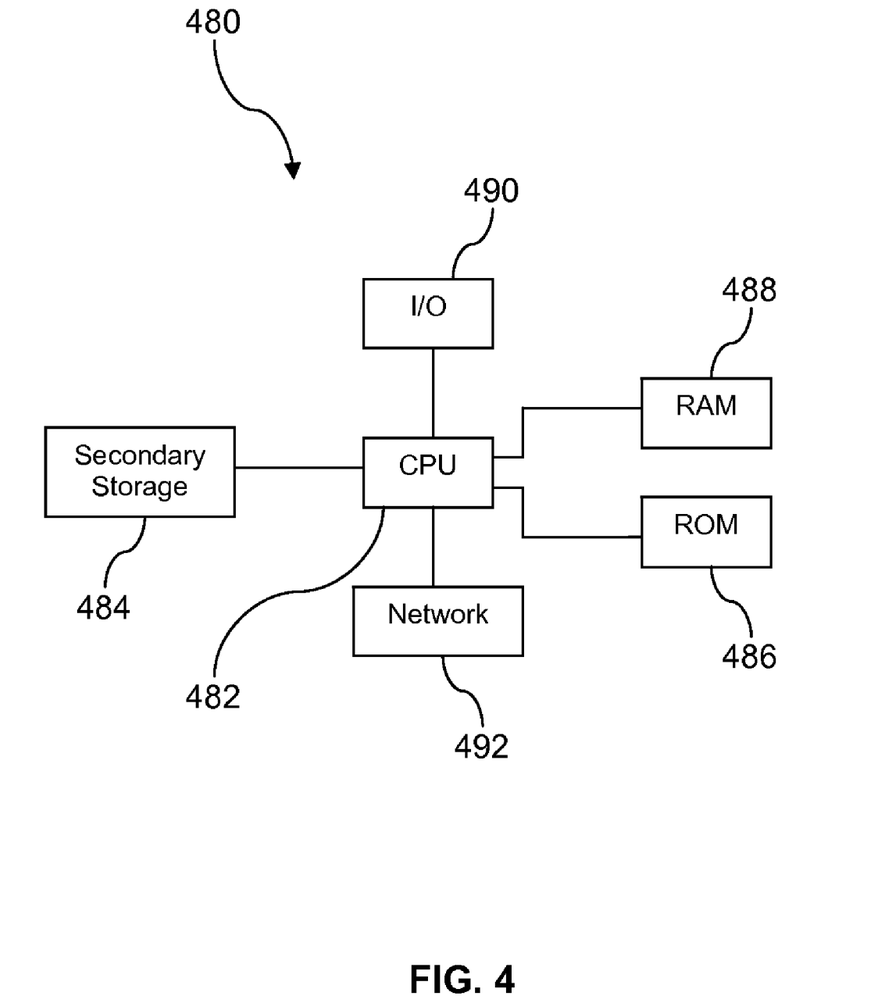
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system, comprising:
    a processor;
    a memory; and
    an application, that, when executed by the processor,
        receives input about a first observed behavior associated with a first performance metric,
        receives input about a first coaching program applied to the first observed behavior;
        calculates a first change in the first performance metric;
        receives input about a second coaching program applied to the first observed behavior based on the first change in the first performance metric and based on a first observed change in the first observed behavior, calculates a second change in the first performance metric associated with a second observed change in the first observed behavior, determines a first element of the first coaching program that impacted the first observed change in the first observed behavior, determines a second element of the second coaching program that impacted the second observed change in the first observed behavior, and combines the first element and the second element in a third coaching program for use in applying to instances of the first observed behavior associated with the first performance metric.

2. The system of claim 1, wherein the first performance metric is a measurement of activity by an agent employed in a call center environment, wherein the first observed behavior is exhibited by the agent, and wherein the first observed behavior is associated with telephone calls handled by the agent.

3. The system of claim 1, wherein observations of the first observed behavior comprise at least one of listening to telephone calls handled by the agent and monitoring keyboard, display, and pointing device activity associated with the agent at least one of during and after the conclusion of telephone calls.

4. The system of claim 1, wherein the first performance metric comprises one of a measure of customer satisfaction (CSAT), a measure of average handle time (AHT), a measure of first call resolution (FCR), and a measure of average revenue produced per call handled.

5. The system of claim 1, wherein the system measures a plurality of observations of the first observed behavior associated with measurements of the first performance metric.

6. The system of claim 5, wherein the system measures a plurality of observations of the first observed behavior exhibited by a plurality of agents.

7. The system of claim 1, wherein elements of the first coaching program and the second coaching program comprise at least one of providing training videos to agents, providing training manuals to agents, and providing at least one of live and taped training sessions by at least one of a supervisor, a trainer, and a subject matter expert.

8. The system of claim 1, wherein the application further determines the effectiveness of a coaching program by evaluating the actions of at least one of a supervisor, a trainer, and a subject matter expert in administering the coaching program.

9. The system of claim 1, wherein the system promotes observations of a second observed behavior associated with the first performance metric, wherein the second observed behavior is additionally associated with a second performance metric, and wherein analysis of the association of the second observed behavior with the second performance metric supports analysis of the association of the first observed behavior with the first performance metric.

10. A processor-implemented method, comprising:
a measurement server determining a first composite performance measure for a first agent in a call center environment wherein first composite performance measures are determined for each of a plurality of agents;
the measurement server ranking the plurality of agents in order by first composite performance measure determined for each agent;
the measurement server associating each of the agents with one of a first segment, with a second segment, with a third segment, and with a fourth segment based on the ranking;
the measurement server applying a first coaching program to agents associated with the first segment, applying a second coaching program to agents associated with the second segment, applying a third coaching program to agents associated with the third segment, and applying a fourth coaching program to agents associated with the fourth segment;
after a predetermined time period subsequent to the application of the coaching programs, the measurement server determining a second composite performance measure for the first agent wherein second composite performance measures are additionally determined for the plurality of agents;
the measurement server ranking the plurality of agents in order by second composite performance measure determined for each agent;
the measurement server associating each of the agents with one of the first segment, the second segment, the third segment, and the fourth segment based on the ranking;
the measurement server analyzing changes in the associations of agents with the segments from the determination of the first composite performance measures to the determination of the second composite performance measures; and
the measurement server executing changes to the coaching programs based on the analysis of changes in associations of agents with the segments from the determination of the first composite performance measures to the determination of the second composite performance measures.

11. The method of claim 10, wherein determining the first composite performance measure and determining the second composite performance measure comprise applying a first weight to a first performance metric, applying a second weight to a second performance metric, applying a third weight to a third performance metric, and applying a fourth weight to a fourth performance metric.

12. The method of claim 11, wherein the first weight, the second weight, the third weight, and the fourth weight are measures of relative importance applied to performance metrics achieved by the agents and wherein the performance metrics are measurements of aspects of the agents' performance in handling telephone calls.

13. The method of claim 10, wherein the first segment comprises a highest ranking portion of agents by composite performance measures, the second segment comprises a second highest ranking portion of agents by composite performance measures, the third segment comprises a third highest ranking portion of agents by composite performance measures, and the fourth segment comprises a fourth highest ranking portion of agents by composite performance measures.

14. The method of claim 13, wherein ranked agents are equally distributed across the first segment, the second segment, the third segment, and the fourth segment.

15. The method of claim 13, wherein ranked agents are distributed across the first segment, the second segment, the third segment, and the fourth segment using a statistical distribution comprising one of a normal distribution, a chi distribution, and a Gamma distribution.

16. The method of claim 10, wherein weights and associations with segments for an agent are dependent in part on agent tenure.

17. The method of claim 10, wherein executing changes to the coaching programs comprises executing a first change to the first coaching program, executing a second change to the second coaching program, executing a third change to the third coaching program, and executing a fourth change to the fourth coaching program.

18. A processor-implemented method, comprising:
- a measurement server receiving a first report of agent performance in a call center environment wherein a first plurality of agents described in the report achieve satisfactory levels for a first performance metric and a second performance metric and achieve unsatisfactory levels for a third performance metric;
- the measurement server observing a plurality of telephone calls handled by a second plurality of agents, wherein the second plurality of agents is a subset of the first plurality of agents;
- the measurement server determining that a first behavior is exhibited by the second plurality of agents during at least a predetermined percentage of the observed plurality of telephone calls;
- the measurement server determining that the first behavior is associated with the unsatisfactory levels for the third performance metric;
- the measurement server creating a first coaching program directed to reducing instances of the first behavior;
- the measurement server administering the first coaching program to a third plurality of agents, wherein the third plurality is a subset of the second plurality;
- the measurement server receiving a second report of agent performance, the second report describing performance of the third plurality of agents in achieving levels of the first performance metric, the second performance metric, and the third performance metric subsequent to the administration of the first coaching program, the second report additionally describing the performance of a fourth plurality of agents in achieving levels of the first performance metric, the second performance metric, and the third performance metric, wherein the fourth plurality of agents comprises the first plurality of agents less the third plurality of agents; and
- the measurement server executing at least a first change to the first coaching program based on an analysis of the second report.

19. The method of claim 17, wherein the nature of the first change to the first coaching program depends in part on improvements made by the third plurality of agents as demonstrated in the second report.

20. The method of claim 17, wherein profiles are developed for a plurality of combinations of levels of performance metrics and wherein one of a coaching program and a plurality of coaching programs are developed and targeted to each profile.

* * * * *